United States Patent [19]

Matsuura et al.

[11] 4,027,088

[45] May 31, 1977

[54] PROCESS OF PREPARING POLYOLEFINS

[75] Inventors: Kazuo Matsuura, Kawasaki;
Masaomi Matsuzaki, Yokohama;
Fumiaki Oshimi, Kawasaki;
Nobuyuki Kuroda, Yokohama;
Mituji Miyoshi, Kanagawa, all of Japan

[73] Assignee: Nippon Oil Company Ltd., Japan

[22] Filed: July 11, 1975

[21] Appl. No.: 595,371

[30] Foreign Application Priority Data

July 19, 1974 . Japan .................. 49-82119

[52] U.S. Cl. .................. 526/124; 252/429 C; 526/129; 526/156; 526/352
[51] Int. Cl.$^2$ ............... C08F 4/02; C08F 10/02
[58] Field of Search ...... 260/93.7, 94.9 DA, 94.9E; 526/124

[56] References Cited

UNITED STATES PATENTS

| 2,345,655 | 4/1944 | Branlenburg | 423/554 |
| 3,705,886 | 12/1972 | Kashiwa et al. | 260/94.9 DA |

FOREIGN PATENTS OR APPLICATIONS

| 1,264,416 | 2/1972 | Germany |
| 1,140,649 | 1/1969 | United Kingdom |

OTHER PUBLICATIONS

Goodsel et al., Chemical Abstracts, vol. 76, 1972, col. 103408n.

*Primary Examiner*—Edward J. Smith
*Attorney, Agent, or Firm*—Hill, Gross, Simpson, Van Santen, Steadman, Chiara & Simpson

[57] ABSTRACT

A process of polymerizing or copolymerizing a class of olefins is carried out in the presence of a catalyst, which catalyst comprises one of more solid compounds selected as a carrier from the group consisting of an oxide, a double oxide and a hydroxide of halogen-free magnesium and/or calcium. The carrier is treated by direct contact with gaseous sulfur dioxide ($SO_2$) under a gaseous atmosphere. A titanium and/or vanadium compound, viz. Ziegler catalyst component, is deposited on the treated carrier and activated by an organometal compound.

4 Claims, No Drawings

PROCESS OF PREPARING POLYOLEFINS

BACKGROUND OF THE INVENTION

This invention relates to a process of preparing polyolefins, and more particularly to the polymerization or copolymerization of olefins using novel catalysts.

Heretofore, there have been proposed a great many catalysts useful for the production of polyolefins. Among such known catalysts are the ones which are obtained by contacting transition metal compounds such as titanium and/or vanadium with organometal compounds of Groups I-IV metals of the Periodic Table. An improvement in this type of catalyst is also known which comprises a transition metal compound such as for example titanium tetrachloride supported on an inorganic solid carrier such as magnesium hydroxychloride, magnesium halide, magnesium hydroxide, magnesium oxide or the like and subsequently activated by an organometal compound. Such supported catalysts are normally very active and in most cases active enough to dispense with the step of catalyst removal which is rather complicated in the process of polyolefin preparation. For this reason, the recent trend in the art has been directed to the use of magnesium and various other metallic compound carriers for catalyst components.

However, while solid carriers of the type consisting of magnesium hydroxychloride and magnesium halide contribute to increased catalytic activity, they have the drawback that halogen content is relatively high in the polyolefin which is obtained by a process dispensing with the step of catalyst removal. Whereas, another type of carrier consisting of magnesium oxide and magnesium hydroxide is advantageous in respect of the halogen content, but has much to be desired for catalytic activity. It is known to improve the activity of magnesium oxide or magnesium hydroxide supported catalysts by halogenating these magnesium compounds. This however still involves the problem of halogen residues in polymerized products.

SUMMARY OF THE INVENTION

Whereas the present invention is aimed at the provision of a process for the polymerization or copolymerization of olefins with use of a novel catalyst capable of giving high yields of polyolefins without involving the foregoing difficulties of the prior art.

Briefly stated, there is provided in accordance with the invention a process for the production of polyolefins by polymerizing or copolymerizing a class of olefins in the presence of a catalyst, which catalyst comprises one or more solid compounds selected as a carrier from the group consisting of an oxide, a double oxide and a hydroxide of halogen-free magnesium and/or calcium and treated by direct contact with gaseous sulfur dioxide ($SO_2$) under a gaseous atmosphere and a catalyst component consisting of titanium and/or vanadium compound, viz. Ziegler catalyst component, deposited on said carrier and activated by an organometal compound.

DETAILED DESCRIPTION OF THE PREFERRED EMBODIMENTS

The term gaseous atmosphere as used herein includes an atmosphere of gaseous $SO_2$ alone and an atmosphere of gaseous $SO_2$ mixed with an inert gas. By the inert gas is meant a gaseous material which is substantially free from interaction with the above solid carrier when the latter is contacted with $SO_2$ under conditions hereafter described. Illustrative of such inert gas are air, nitrogen, oxygen and argon.

It has now been found that remarkably high catalytic activity in the polymerization or copolymerization of various olefins can be achieved by the use of a catalyst carrier or support consisting of any of the above listed solid compounds which is treated simply by contacting the same with gaseous $SO_2$ under a gaseous atmosphere. Catalysts supported on such treated carriers according to the invention exhibit far greater activity particularly based on the transition metal used as compared with catalysts which are not treated with $SO_2$.

The term oxide, double oxide and hydroxide of magnesium and/or calcium includes any such commercially available products either synthesized or naturally occurring. The double oxide under contemplation is an oxide of magnesium and/or calcium containing one or more of other metals. Typical examples are $MgO.Al_2O_3$, $MgO.SiO_2$, $MgO.Al_2O_3.CaO$, $CaO.Al_2O_3$, $CaO.SiO_2$ and natural or synthetic hydrotalcite. It is to be noted that these formulae are merely of composition, not of molecular representation and that the structure and the ratio of components of the double oxides employed in the practice of the invention are not to be limited thereby. The oxides, double oxides and hydroxide defined as above may be used alone or as mixtures of two or more of them.

The solid carriers according to the invention may contain absorbed water if not excessive and may be calcined.

The treatment of the above carrier-forming solid compounds with $SO_2$ may be effected by means of a well-known fixed or fluidized bed containing the solid compounds which is brought into direct contact with gaseous $SO_2$ at temperatures ranging between room temperature and 800° C, preferably between 120° C and 300° C for a period of 1 to 24 hours, although this contact time length is not mandatory. While the precise details of the reaction which takes place of the solid carrier with $SO_2$ are not known, there have been found substantial amounts of sulfur atom in the $SO_2$ treated solid compound, which believably accounts for the possibility of forming a novel carrier. The conditions of contact of the solid compound with $SO_2$ should be adjusted so that sulfur content in the treated solid carrier may be in the range of 0.1 to 20 weight percent, preferably 0.5 to 5 weight percent to obtain a maximum catalytic activity.

Any conventional procedure may be employed for supporting titanium and/or vanadium compounds on the above carriers. For example, the carrier may be contacted under heated conditions with a transition metal compound of the class hereafter identified either in the presence or in the absence of suitable inert solvents. Conveniently both carrier and transition metal compound may be heated at temperatures ranging between 50° and 300° C, preferably between 100° and 150° C without solvents. Reaction time is not restricted but may ordinarily be 5 minutes or longer, possible up to 10 hours, although this upper limit is not too important. An alternative procedure is to bring both materials mechanically into contact with each other as by means of ball milling, which of course should be done in an inert gas atmosphere free of oxygen and moisture.

The transition metal compound may be used in amounts of 0.001 to 50 times by weight with respect to the carrier, with excess transition metal compound preferably removed with a solvent after the same has been deposited on the carrier. There is no limitation as to how to remove unreacted transition metal compound. This can be done by repeatedly washing the compound with a solvent inert to Ziegler catalysts and evaporating the washing liquid under vacuum so as to obtain solid particles as is well known in the art.

The polymerization reaction of olefins using the catalyst of the invention is conducted substantially in the same manner as in the polymerization reaction using a conventional Ziegler catalyst, wherein substantially oxygen- and moisture-free conditions are maintained throughout the reaction. The polymerization conditions for olefins include a temperature in the range of 20° to 300° C, preferably 50° to 180° C and a pressure in the range of normal to 70 kg/cm$^2$, preferably 2 to 60 kg/cm$^2$. Molecular weight control may be effected to some degree by changing the polymerization conditions such as temperatures and mol ratio of the catalyst but can be more effectively done by addition of hydrogen to the polymerization system. With the catalyst of the invention, two- or more multi-stage reactions can be effected under different hydrogen concentrations, temperatures and other polymerization conditions.

The process of the invention can be applied to the polymerization of all olefins polymerizable with Ziegler catalysts and typically to the homopolymerization of alpha-olefins such as ethylene, propylene and 1-butene, or to the copolymerization of ethylene and propylene, ethylene and 1-butene, and propylene and 1-butene.

The transition metal compounds employed in accordance with the invention may be any titanium or vanadium compounds which can be used as Ziegler catalyst components. Illustrative are tetravalent titanium compounds such as titanium tetrachloride, titanium tetrabromide, mono-ethoxytitanium trichloride, diethoxytitanium dichloride, dibuthoxytitanium dichloride, phenoxytitanium trichloride and tetra-n-buthoxytitanium; trivalent titanium compounds such as titanium trichloride and titanium trichloridealuminum trichloride complex; trivalent vanadium compounds such as vanadium trichloride; tetravalent vanadium compounds such as vanadium tetrachloride; and pentavalent vanadium compounds such as vanadium oxytrichloride and orthoalkyl vanadate.

The term organometal compound as used herein includes compounds of metals of Group I-IV of the Periodic table which are generally known as Ziegler catalyst components. Preferable are organoaluminum compounds and organozinc compounds. The organoaluminum compounds are represented by the general formulae:

$R_3Al$, $R_2AlX$, $RAlX_2$, $R_2AlOR$, $RAl(OR)_2$, $RAl(OR)X$ and $R_3Al_3X_3$ wherein R is alkyl or aryl group and X is halogen atom. The organozinc compounds are represented by the general formula:

$R_2ZN$ wherein R is alkyl group. Typical examples of such organometal compounds include triethylaluminum, triisobutylaluminum, trihexylaluminum, trioctylaluminum, tridecylaluminum, diethylaluminum chloride, ethylaluminum sesquichloride, diethylzinc, and mixtures thereof. No particular limitations are imposed upon the amount of each of these organometal compounds to be used in the process of the invention. However, the organometal compounds can usually be used in amounts of 0.1 to 1,000 mol times the transition metal halide.

The invention will be further described by way of the following examples which are merely illustrative but are not intended to limit the invention thereto.

EXAMPLE 1 a. Preparation of Catalyst 10 grams of a commercially available magnesium oxide were heated at 500° C for 5 hours. The oxide was thereafter placed in a glass tube 3.5 cm in diameter equipped with a perforated plate and maintained at 200° C, while gaseous $SO_2$ was supplied from the lower portion of the tube for a period of 4 hours. After completion of this treatment, a purified nitrogen gas was introduced at 200° C for 30 minutes, until there was obtained a carrier having a sulfur content of 3.7 weight percent. The resulting carrier was transferred to a flask equipped with stirrer and containing 80 ml titanium tetrachloride. The admixture was heated at 130° C for 2 hours and thereafter washed with hexane. Washing was repeated until the titanium tetrachloride completely disappeared. The solid portion of the product was dried and analyzed to show a deposit of 14 mg titanium per gram of solid.

b. Polymerization

A 2 liter stainless steel autoclave equipped with an induction stirrer was purged with nitrogen and charged with 1,000 ml hexane, 5 millimols triethyl aluminum and 612 mg of the solid prepared as above. The whole was heated to 90° C with stirring. The system was pressurized to 2 kg/cm$^2$ by the vapor pressure of hexane and charged with hydrogen to a total pressure of 6 kg/cm$^2$, followed by a continuous charge of ethylene to a total pressure of 10 kg/cm$^2$. The polymerization reaction was thus initiated and continued for one hour. After completion of the reaction, the polymer slurry was transferred to a beaker, and hexane was removed under vacuum thereby providing 362 grams white polyethylene having a melt index of 1.78. Catalytic activity was represented by 10,600 grams polyethylene per gram titanium per hour per ethylene pressure, or 148 grams polyethylene per gram solid per hour per ethylene pressure. This value of catalytic activity per titanium is far greater than that obtainable with the catalyst which is not pretreated with $SO_2$ as in Comparing Example 1 below.

COMPARING EXAMPLE 1

The procedure of Example 1 was followed in the preparation of a catalyst except that magnesium oxide was not treated with $SO_2$. The resulting catalyst had a deposit of 60 mg titanium per gram solid. 161 mg of the catalyst were used in the polymerization of ethylene which was effected under the same conditions as in Example 1. There was obtained 101 grams white polyethylene having a melt index of 1.37. Catalytic activity was represented by 2620 grams polyethylene per gram titanium per hour per ethylene pressure.

EXAMPLE 2

The procedure of Example 1 was followed in the preparation of catalyst except that magnesium oxide was treated with $SO_2$ at 100° C for 3 hours, thereby providing a carrier having a sulfur content of 3.2 weight percent. Titanium tetrachloride was deposited on the carrier under the same conditions as in Example 1. The resulting catalyst had a deposit of 21 mg titanium per gram solid.

Ethylene was polymerized with use of 320 mg of catalyst according to the procedure of Example 1. There was obtained 190 grams white polyethylene having a melt index of 1.42. Catalyst activity was represented by 7,050 grams polyethylene per gram titanium per hour per ethylene pressure.

EXAMPLE 3

The precedure of Example 1 was followed in the preparation of catalyst except that 10 grams magnesium hydroxide was used. 2 mg titanium was deposited per gram solid. 3,720 mg of this catalyst were used in the polymerization of ethylene conducted under the same conditions as in Example 1. There was obtained 200 grams white polyethylene having a melt index of 0.63. Catalytic activity was represented by 6,700 grams polyethylene per gram titanium per hour per ethylene pressure.

COMPARING EXAMPLE 2

The procedure of Example 3 was followed in the preparation of catalyst except that magnesium hydroxide was not treated with $SO_2$. 10 mg titanium was deposited per gram solid. 1,180 mg of this catalyst were used in the polymerization of ethylene conducted in accordance with the procedure of Example 1. There was obtained 187 grams white polyethylene having a melt index of 0.14. Catalytic activity was 3,900 grams polyethylene per gram titanium per hour per ethylene pressure.

EXAMPLE 4

A commercially available $MgO.Al_2O_3$ (Mg/Al atomic ratio = 1.25) was heated at 500° C for 5 hours and treated with $SO_2$ at 200° C for 5 hours, until there was obtained a carrier having a sulfur content of 3.5 weight percent. A catalyst was prepared using this carrier in the same manner as in Example 1. The catalyst had a deposit of 18 mg titanium per gram solid. The procedure of Example 1 was also followed in the polymerization of ethylele except that 293 mg of this catalyst were used. There was obtained 46 grams white polyethylene having a melt index of 0.02. Catalytic activity was 2,150 grams polyethylene per gram titanium per hour per ethylene pressure.

COMPARING EXAMPLE 3

The procedure of Example 4 was followed in catalyst preparation except that the carrier was not treated with $SO_2$. Ethylene was polymerized with use of 132 grams of this catalyst. There was obtained 19 grams polyethylene having a melt index of 0.06. Catalytic activity was 1,030 grams polyethylene per gram titanium per hour per ethylene pressure.

EXAMPLE 5

The procedure of Example 1 was followed in catalyst preparation except that trichloromonobutoxy titanium was used in place of titanium tetrachloride. The resulting catalyst had a deposit of 13 mg titanium per gram solid. The procedure of Example 1 was also followed in the polymerization of ethylene except that 357 mg catalyst and triisobutylaluminum instead of triethylaluminum were used. There was obtained 184 grams white polyethylene having a melt index of 1.51. Catalytic activity was 9,900 grams polyethylene per gram titanium per hour per ethylene pressure.

COMPARING EXAMPLE 4

The procedure of Example 5 was followed in catalyst preparation except that the carrier was not treated with $SO_2$. Ethylene was polymerized with this catalyst under the same conditions as in Example 5. There was obtained 61 grams white polyethylene having a melt index of 1.30. Catalytic activity was 2,710 grams polyethylene per gram titanium per hour per ethylene pressure.

EXAMPLE 6

581 mg catalyst prepared in Example 1 was used in the polymerization reaction wherein hexane, triethylaluminum, solid catalyst and hydrogen were charged into the autoclave, followed by a charge of ethylene-propylene gas containing 2 mol percent of propylene at 90° C. The reaction was continued for one hour maintaining the autoclave at 10 kg/cm². There was obtained 298 grams ethylene-propylene copolymer having a melt index of 1.65 and containing 4.9 methyl groups per 1,000 carbon atoms. Catalytic activity was 9,150 grams polyethylene per gram titanium per hour per ethylene pressure.

EXAMPLE 7

The procedure of Example 1 was followed in catalyst preparation except that vanadium tetrachloride was used in lieu of titanium tetrachloride. There was obtained a catalyst having 19 mg vanadium deposited per gram solid. Ethylene was polymerized with use of 398 mg of this catalyst in the same manner as in Example 1. There was obtained 228 grams white polyethylene having a melt index of 1.05. Catalytic activity was 7,520 grams polyethylene per gram vanadium per hour per ethylene pressure.

COMPARING EXAMPLE 5

The procedure of Comparing Example 1 was followed in catalyst preparation except that vanadium tetrachloride was used in lieu of titanium tetrachloride. Example 1 was followed in the polymerization of ethylene. Catalytic activity was 2,500 grams polyethylene per gram vanadium per hour per ethylene pressure.

EXAMPLE 8

The procedure of Example 1 was followed in catalyst preparation except that calcium oxide was used in lieu of magnesium oxide. 531 mg of the resulting catalyst were used in the polymerization of ethylene in the same manner as in Example 1. There was obtained 70 grams white polyethylene. Catalytic activity was 3,000 grams polyethylene per gram titanium per hour per ethylene pressure.

COMPARING EXAMPLE 6

The procedure of Example 8 was followed in catalyst preparation except that the $SO_2$ treatment was omitted. Polymerization was carried out in accordance with the procedure of Example 1. Catalytic activity was 938 grams polyethylene per gram titanium per hour per ethylene pressure.

What is claimed is:
1. A process for the production of polyolefins by polymerizing or copolymerizing one or more olefins in the presence of a catalyst comprising a transition metal compound supported on a solid carrier selected from the group consisting of an oxide, a double oxide and a hydroxide of magnesium and/or calcium and an organo-metallic compound selected from the group consisting of an organo-aluminum compound and an organozinc compound, said transition metal compound being selected from the group consisting of tetravalent titanium compounds, trivalent titanium compounds, pentavalent vanadium compounds, tetravalent vanadium compounds and trivalent vanadium compounds, said solid carrier being treated by direct contact with gaseous sulfur dioxide ($SO_2$) at a temperature in the range of room temperature to 800° C under a gaseous atmosphere and consisting of a product containing from 0.1% to 20% by weight sulfur.

2. The process of claim 1 wherein said double oxide is selected from the group consisting of $MgO.Al_3O_3$, $MgO.SiO_2$, $MgO.Al_2O_3.CaO$, $CaO.Al_2O_3$, $CaO.SiO_2$ and natural or synthetic hydrotalcite.

3. The process of claim 1 wherein said carrier is contacted with said catalyst component at a temperature in the range of 50° to 300° C.

4. The process of claim 1 wherein said catalyst component is used in amounts of 0.001 to 50 times by weight with respect to said carrier.

* * * * *